(12) United States Patent
Manov et al.

(10) Patent No.: US 6,556,139 B2
(45) Date of Patent: Apr. 29, 2003

(54) SYSTEM FOR AUTHENTICATION OF PRODUCTS AND A MAGNETIC TAG UTILIZED THEREIN

(75) Inventors: Vladimir Manov, Hafia (IL); Evgeni Sorkine, Tel Aviv (IL); Eli Yarkoni, Kochav Yair (IL)

(73) Assignee: Advanced Coding Systems Ltd., Even Yehuda (IL)

(*) Notice: Subject to any disclaimer, the term of this patent is extended or adjusted under 35 U.S.C. 154(b) by 12 days.

(21) Appl. No.: 09/753,617

(22) Filed: Jan. 4, 2001

(65) Prior Publication Data

US 2002/0057201 A1 May 16, 2002

Related U.S. Application Data
(60) Provisional application No. 60/247,996, filed on Nov. 14, 2000.

(51) Int. Cl.[7] .............................................. G08B 13/14
(52) U.S. Cl. ................................ 340/572.6; 340/572.1; 148/300; 148/306; 148/307; 148/313; 235/449; 235/462.01; 428/611; 65/59.27
(58) Field of Search ....................... 340/572.1, 572.6; 148/304, 306, 313, 300, 307, 121, 122, 100; 235/439, 449, 462.01; 428/611; 65/160, 60.1, 59.25, 59.26, 59.27, 59.31

(56) References Cited

U.S. PATENT DOCUMENTS

| | | | | |
|---|---|---|---|---|
| 3,607,201 A | * | 9/1971 | Zaborovsky et al. | 65/162 |
| 3,832,530 A | * | 8/1974 | Reitboeck et al. | 235/439 |
| 4,203,544 A | | 5/1980 | Guilgue | 235/449 |
| 4,484,184 A | | 11/1984 | Gregor et al. | 340/572.2 |
| 5,175,419 A | * | 12/1992 | Yamashita | 235/449 |
| 5,477,219 A | * | 12/1995 | Zarembo et al. | 340/572.3 |
| 5,801,630 A | | 9/1998 | Ho et al. | 340/572.2 |
| 5,831,532 A | * | 11/1998 | Gambino et al. | |
| 6,100,985 A | | 8/2000 | Scheiner et al. | 356/630 |
| 6,120,617 A | * | 9/2000 | Hausch et al. | 148/121 |
| 6,169,483 B1 | * | 1/2001 | Ghaffari et al. | 340/572.3 |
| 6,222,452 B1 | * | 4/2001 | Ahlstrom et al. | 340/572.1 |
| 6,270,591 B2 | * | 8/2001 | Chiriac et al. | 148/300 |
| 6,351,215 B2 | * | 2/2002 | Rodgers et al. | 340/572.1 |
| 6,355,361 B1 | * | 3/2002 | Ueno et al. | 428/611 |
| 6,362,737 B1 | * | 3/2002 | Rodgers et al. | 340/572.1 |

FOREIGN PATENT DOCUMENTS

| | | |
|---|---|---|
| EP | 0 833 351 | 4/1998 |
| FR | 2 720 534 | 12/1995 |

OTHER PUBLICATIONS

J. Gonzalez et al., "Magnetoelastic Behavior of Glass–Covered Amorphous Ferromagnetic Microwire", *IEEE Transactions on Magnetics*, May 1997, p. 2362–2365, vol. 33, No. 3.

Antonenko et al., "High frequency properties of glass–coated microwire", *Journal of Applied Physics*, (1998) vol. 83 No. 11, pp. 6587–6589.

* cited by examiner

*Primary Examiner*—Benjamin C. Lee
(74) *Attorney, Agent, or Firm*—Browdy and Neimark, P.L.L.C.

(57) ABSTRACT

A magnetic microwire for use in a magnetic tag attachable to a product is provided to enable authentication of the product, as well as the magnetic tag, a detector device and a system for product authentication utilizing the same. The magnetic microwire is a glass-coated amorphous magnetic microwire characterized by a large Barkhausen discontinuity and substantially zero or positive magnetostriction. The microwire is responsive to an external alternating magnetic field generated by the detector device to produce short pulses of magnetic field perturbations.

15 Claims, 6 Drawing Sheets

SYSTEM FOR AUTHENTICATION OF PRODUCTS AND A MAGNETIC TAG UTILIZED THEREIN

CROSS REFERENCE TO RELATED APPLICATIONS

The present application claims the benefit of U.S. Provisional Application No. 60/247,996, filed Nov. 14, 2000.

FIELD OF THE INVENTION

This invention is generally in the field of product authentication techniques, and relates to a system for the authentication of products, and a magnetic tag utilized therein.

BACKGROUND OF THE INVENTION

Forgery of original products is becoming one of the major concerns in the fields of production and distribution, Therefore, considerable efforts have been undertaken throughout the world in the field of protecting the authenticity of goods. The authentication of bottled products, such as alcoholic beverages, perfumes, drugs, is of particular importance for public safety.

Known authentication means are based mostly on the use of optical means, such as special printing and holograms. However, printed authentication tags can easily be counterfeited. As for holograms, their authenticity can be verified only by means of special optical equipment.

Magnetic identification means are also widely used, in particular, in anti-shoplifting systems. Markers made of soft magnetic amorphous alloy ribbons, as disclosed, for example, in U.S. Pat. No. 4,484,184, are the most widely used. The commonly accepted shape of a marker is that of an elongated strip. Although such markers are characterized by their specific response to an interrogating magnetic field, they are not convenient for article authentication, because of the availability of amorphous ribbon in today's market and possible counterfeit. Another disadvantage of amorphous strip based markers is the fact that the minimum strip width is about 0.5 mm, and therefore it is difficult to conceal the magnetic element of the marker.

U.S. Pat. No. 5,801,630 discloses a method for preparing a magnetic material with a highly specific magnetic signature, namely, with a magnetic hysteresis loop having large Barkhausen discontinuity at low coercivity values. The material is prepared from a negative-magnetostrictive metal alloy by casting an amorphous metal wire, processing the wire to form longitudinal compressive stress in the wire, and annealing the processed wire to relieve some of the longitudinal compressive stress. The disadvantage of using such a material in article authentication applications is associated with the relatively large diameter of a single wire, typically 50 micrometers or more. Another disadvantage is the complicated multi-stage process of the wire preparation. Still another disadvantage of using his material is the brittleness of an amorphous annealed wire (due to the wire annealing), which prevents the use of this material in flexible markers (i.e., to be attached to a flexible item).

Amorphous magnetic glass-coated microwires have been examined and found as characterized by a unique response to an interrogating magnetic field. This is disclosed in the article "High Frequency Properties of Glass-Coated Microwire", A. N. Antonenko, E. Sorkine, A. Rubshtein, V. S. Larin and V. Manov, Journal of Applied Physics, Vol. 83, No. 11, 1998, pp. 6587–6589.

SUMMARY OF THE INVENTION

It is an object of the present invention to provide a magnetic microwire for use in a magnetic tag for attaching to a product for product authentication purposes, It is another object of the present invention to provide a magnetic tag for use with various kinds of products for product-authentication purposes. The tag is characterized by its unique response to an external alternating magnetic field.

It is still another object of the present invention to provide a hand-held detector device that is capable of unambiguous detection of the magnetic tag.

In accordance with the invention, the magnetic tag (the so-called "authentication tag") utilizes at least one magnetic element formed of a glass-coated amorphous magnetic microwire characterized by a large Barkhausen discontinuity and a zero or positive magnetostriction. Such a microwire; is therefore characterized by very fast re-magnetization, and, when located in a region of an alternating magnetic field, produces significantly shorter pulses of the field perturbations, as compared to the conventional magnetic elements of the kind specified. If a plurality of the glass-coated amorphous magnetic microwires is used, the microwires are arranged in a spaced-apart parallel relationship extending across the entire tag length or a part of it, The microwires may also be arranged in an encoded spatial pattern like a one-dimensional or two-dimensional bar code.

The glass-coated amorphous magnetic microwire is produced in a one-stage casting process from an alloy having substantially zeroed or positive magnetostriction. In one preferred embodiment of the invention, the alloy is cobalt-based, including more than 60% of cobalt by atomic percentage. For example, Co—Fe—Si—B alloy containing 77.5% Co, 4.5% Fe, 12% Si, and 6% B by atomic percentage, or Co—Fe—Si—B—Cr—Mo alloy containing 68.6% Co, 4.2% Fe, 12.6% Si, 11% B, 3.52% Cr and 0.08% Mo by atomic percentage, may be used. The microwire made of this Co—Fe—Si—B—Cr—Mo alloy shows less sensitivity to external mechanical tensions, due to the fact that in this microwire, the metal core and glass coating are physically attached to each other only in several spatially separated points of contact, rather than being in continuous contact. The construction and method of fabrication of such a microwire piece are disclosed in a co-pending application assigned to the assignee of the present application In another embodiment of the invention, the alloy is Fe-based, for example containing 60% Fe, 15% Co, 15% Si and 10% B.

Generally, the fabrication of the microwire is based on a modified Taylor method, according to which the microwire is cast directly from the melt. It is important that the Taylor process enables metals and alloys to be produced in the form of a microwire in a single operation, thus offering an intrinsically inexpensive method of microwire manufacture.

The hand-held detector according to the invention generates an external AC magnetic field, and identifies the presence of the microwires within the magnetic field region (in the tag) by detecting the unique short re-magnetization pulses produced by the microwires in response to the application of this field.

There is thus provided according to one aspect of the preset invention, a magnetic microwire for use in a magnetic tag attachable to a product, thereby enabling authentication of the product, wherein the magnetic microwire is a glass-coated amorphous magnetic microwire characterized by a large Barkhausen discontinuity and substantially zero or positive magnetostriction, such that the microwire is responsive to an external alternating magnetic field to produce short pulses of magnetic field perturbations.

According to another aspect of the present invention, there is provided a magnetic tag for attaching to a product to enable the authentication of the product, the tag comprising at least one glass-coated amorphous magnetic microwire characterized by a large Barkhausen discontinuity and substantially zero or positive magnetostriction, such that, when the tag is located in a region of an external alternating magnetic field, the at least one microwire is re-magnetized by the magnetic field to produce short pulses of magnetic field perturbations.

It should be noted that the magnetic tag may also comprise the conventional hologram. In this case, the one or more glass-coated amorphous magnetic microwires can be accommodated underneath the hologram.

According to yet another aspect of the present invention, there is provided a detector device for applying to a magnetic tag attached to a product, the tag being composed of at least one glass-coated amorphous magnetic microwire characterized by a large Barkhausen discontinuity and substantially zero or positive magnetostriction, such that said at least one microwire can be re-magnetized by an external alternating magnetic field to produce short pulses of magnetic field perturbations, the detector device comprising:

a magnetic field source operable to generate the alternating magnetic field to cause the re-magnetization of said at least one glass-coated amorphous magnetic microwire, when the microwire is located in a region of said alternating magnetic field; and a receiver for receiving the short pulses of the magnetic field perturbations and generating a signal indicative thereof.

The case may be such that a product to be protected is a document of the kind provided with an optical bar code or an encoded magnetic strip containing the document-related information. Such a product may, for example, be a ticket, a credit card, a participant card, etc., which provides the document bearer with certain rights, and which is easy to counterfeit. In this case, the product, in addition to the encoded information carrier (optical or magnetic), can be provided with a magnetic tag according to the invention, namely, comprising one or more glass-coated amorphous magnetic microwires. If the information is encoded by means of a bar code (ire., an optical information reader is to be used), the magnetic tag may be placed underneath the bar code. If a magnetic kind of information encoding is considered (magnetic strip), the magnetic tag should be spaced-apart from the magnetic strip.

Consequently, the above detector elements (the magnetic field source and receiver) are used together with the conventional reader of the encoded information (e.g., bar code reader), and are preferably accommodated in a common housing. Preferably, the detector is designed such that the actuation of the encoded information reader is allowed, only if the magnetic tag has been successfully identified. Hence, the authenticity of the product can be determined to ensure that the document bearer receives the prescribed rights.

According to yet another aspect of the present invention, there is provided a product comprising a tag assembly attached thereto, wherein the tag assembly comprises a magnetic tag comprising at least one glass-coated amorphous magnetic microwire characterized by a large Barkhausen discontinuity and substantially zero or positive magnetostriction, such that, when the tag is located in a region of an external alternating magnetic field, the at least one microwire is re-magnetized by the magnetic field to produce short pulses of magnetic field perturbations.

According to yet another aspect of the present invention, there is provided a system for product authentication, the system comprising:

a magnetic tag for attaching to a product, the tag comprising at least one glass-coated amorphous magnetic microwire characterized by a large Barkhausen discontinuity and substantially zero or positive magnetostriction, such that said at least one microwire can be re-magnetized by an alternating magnetic field to produce short pulses of magnetic field perturbations;

a detector device for applying to said tag, the detector device comprising a magnetic field source operable to generate the alternating magnetic field to cause the re-magnetization of said at least one glass-coated amorphous magnetic microwire, when the microwire is located in a region of said alternating magnetic field; a receiver for receiving said short pulses and generating a signal indicative thereof; and an indicator utility responsive to the signal generated by the receiver to provide an indication signal.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
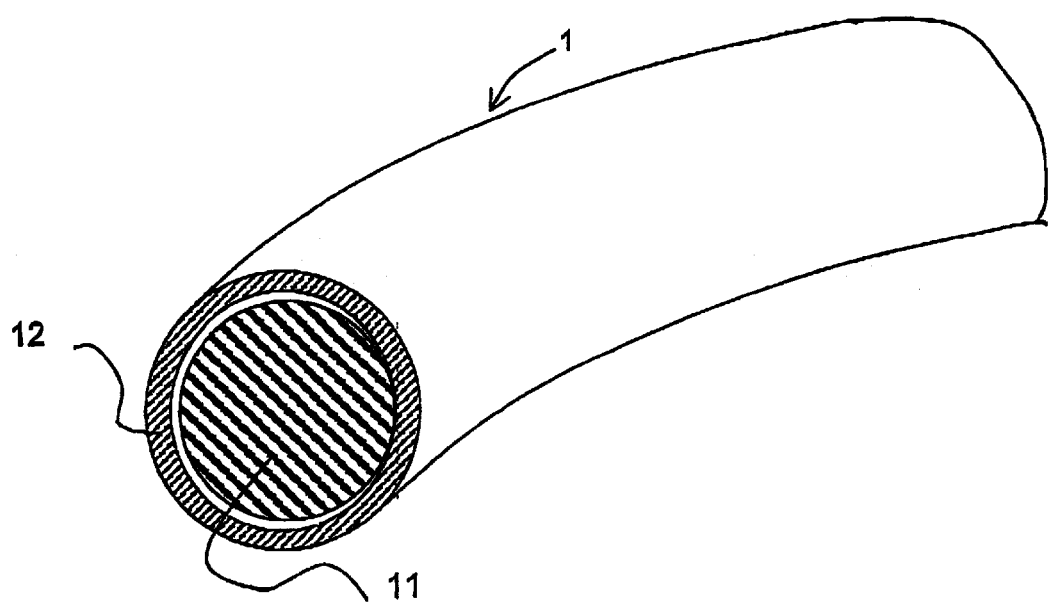
FIG. 1 is a perspective view of a glass-coated microwire.

Referring to FIG. 1, there is illustrated a glass-coated microwire 1 composed of a metal core 11 and a glass coat 12. Generally, the glass-coated microwire 1 can be produced with a very small diameter ranging from 1–2 micrometers to tens of micrometers, from a variety of magnetic and non-magnetic alloys and pure metals. For the purposes of the present invention, the magnetic core 11 of the microwire 1 is prepared with an amorphous metal structure. These amorphous magnetic glass-coated microwires have good mechanical strength, flexibility, and corrosion resistance, so that they can be easily incorporated in paper, plastic, fabrics and other substrate materials. As indicated above, amorphous magnetic glass-coated microwires are characterized by a bisque response to an interrogating magnetic field, and significantly faster re-magnetization as compared to the conventional magnetic elements, as will be described more specifically further below with reference to FIGS. 3a–3c.

The microwire properties can be controlled by varying die alloy composition and the glass-to-metal diameter ratio. Particularly, the microwires that are cast from alloys With zero or positive magnetostriction are characterized by a large Barkhausen discontinuity. For the purposes of the present invention, it is important to utilize such a glass-coated amorphous magnetic microwire having a large Barkhausen discontinuity and a zero or positive magnetostriction. To this ends a Co-based or Fe-based alloy can be used, for example, one of the following: an alloy containing 77.5% Co, 4.5% Fe, 12% Si, and 6% B by atomic percentage, an alloy containing 68.6% Co, 4.2% Fe, 12.6% Six 11% B. 3.52% Cr and 0.08% Mo by atomic percentage, or an alloy containing 60% Fe, 15% Co, 15% Si and 10% B by atomic percentage.

Figure 2:
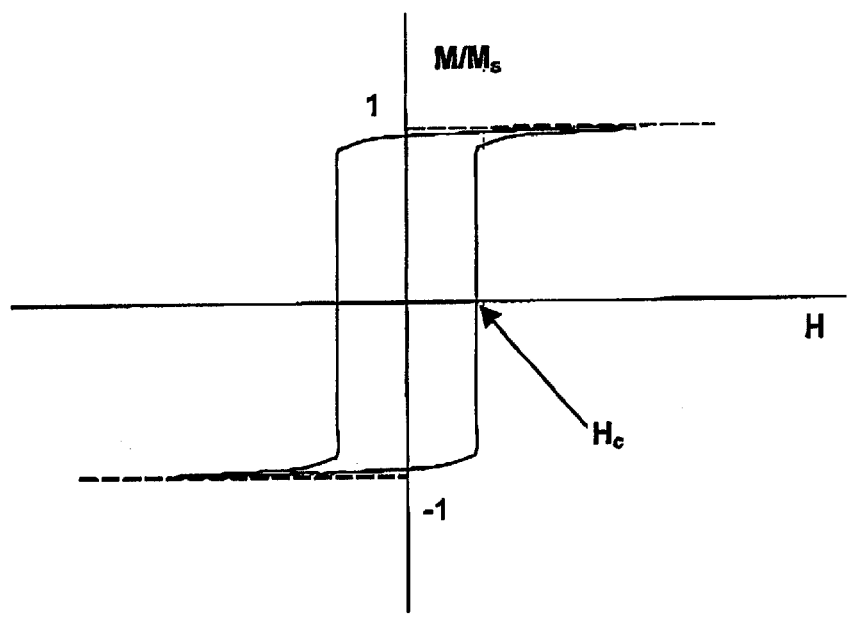
FIG. 2 is an example of the hysteresis loop characteristic of a glass-coated amorphous microwire made of cobalt-based alloy with zero magnetostriction.

FIG. 2 shows an example of a hysteresis loop measured in a sample (glass-coated microwire) prepared from the alloy containing 77.5% Co, 4.5% Fe, 12% Si, and 6% B, characterized by zero magnetostriction. The diameter of the inner metal part for this sample was 15 micrometers, The total diameter of the microwire sample was 17 micrometers. As shown, the microwire sample is characterized by a large Barkhausen discontinuity.

Figure 3A:
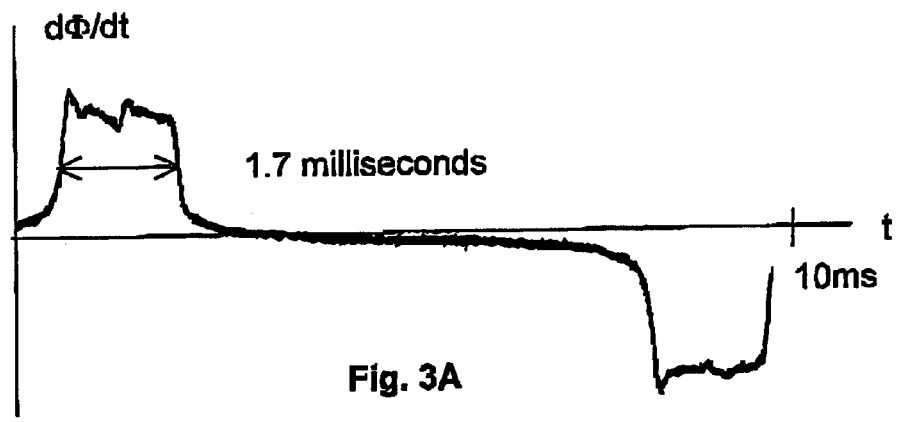
FIGS. 3a to 3c graphically illustrate differences in re-magnetization processes in magnetic elements of markers made of, respectively, the amorphous strip typically used in anti-shoplifting markers, the amorphous wire with large Barkhausen discontinuity used in the markers commercially available from Sensormatic Co., and a glass-coated microwire in accordance with the present invention.
Figure 3B:
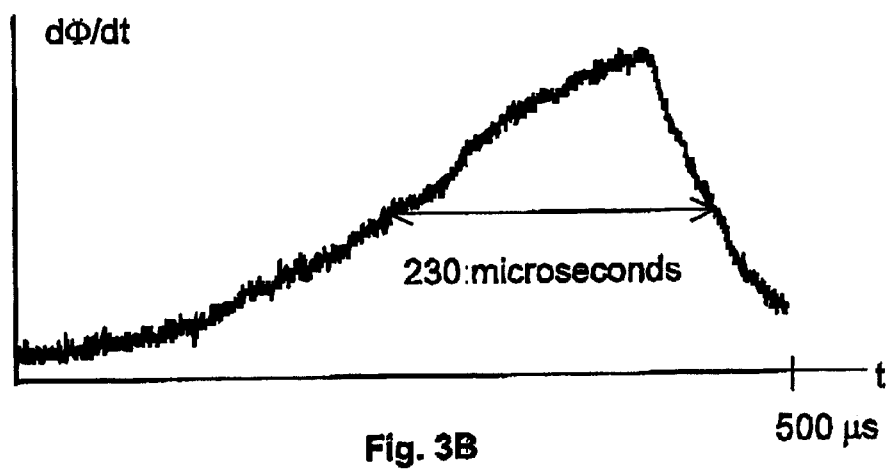
Figure 3C:
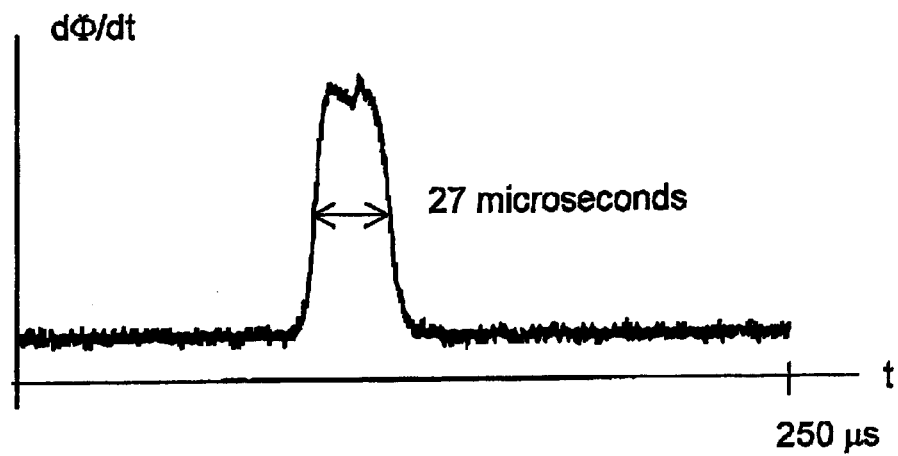

It has been found by the inventors that the process of re-magnetization of such microwire is faster than with any other magnetic element. FIGS. 3a–3c show the differences in re-magnetization processes in three different samples obtained experimentally by applying a triangular-waveform AC external field of a rather low frequency (60 Hz) and a small amplitude of approximately 100 A/m to, respectively, the prior art amorphous strip typically used in anti-shoplifting markers, in-water cast amorphous wire (used in the markers commercially available from Sensormatic Co.), and the glass-coated microwire according to the present invention.

When the field strength achieves the coercive force value $H_e$, then the re-magnetization process starts. The magnetic flux changes give rise to a peak in the flux derivative over time, $d\Phi/dt$ (depicted in arbitrary units). Accordingly, a voltage peak will be observed in a receiving coil placed in the vicinity of the sample.

It was found that the re-magnetization peak width (measured at half amplitude level) was 25 to 80 microseconds for the glass-coated microwire (FIG. 3c). For the markers commercially available from Sensormatic Co. comprising an in-water-cast amorphous wire with large Barkhausen discontinuity, the peak width was 200 to 500 microseconds, and more FIG. 3b). For the amorphous strips typically used in anti-shoplifting markers, like a Meto GmbH 32-mm marker, the peak width was 1–2 milliseconds (FIG. 3a). Other magnetic materials feature much slower re-magnetization process and wider peaks.

Hence, by discriminating the ultimately short re-magnetization peaks of a glass-coated microwire in accordance wit the present invention, it is possible to unambiguously detect its presence in an authentication tag.

Figure 4:
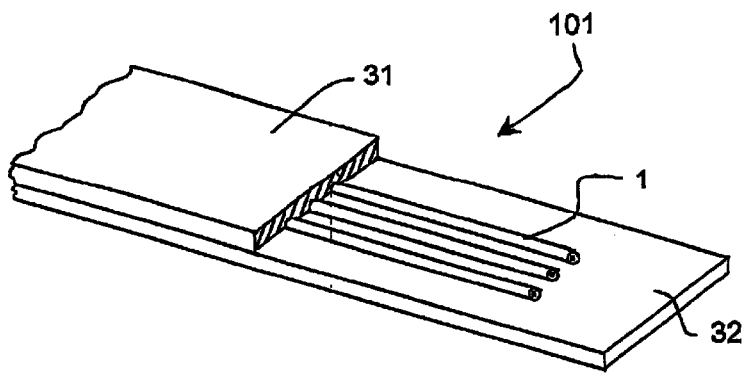
FIG. 4 is a perspective view with portions broken away of a magnetic stiplike authentication tag formed of several parallel microwire pieces in accordance with the present invention.

FIG. 4 shows one embodiment of an authentication tag 101 according to the invention comprising magnetic amorphous glass-coated microwires characterized by large !Barkhausen discontinuity and zero or positive magnetostriction. The tag 101 may include one or several microwire pieces—three such pieces, generally at 1, are shown in the present example arranged in a parallel spaced-apart relationship, each extending along the entire tag or a part thereof. In other words, the microwires are arranged in a strip-like form. The microwire pieces 1 are sandwiched between a substrate 2 and an overlayer 3 of the tag. The external surface of the substrate 2 may be, coated with a suitable adhesive material to secure the tag 101 to an article (e.g., to a bottle neck) which is to be protected for authentication purposes. The overlayer 3 may be used for printing a label on it, or for other known arrangements.

It should be noted that the microwire pieces may be embedded inside the plastic shrinkable sleeve that is traditionally used to cover the bottle neck and cork. It may be also useful to combine the microwire with synthetic filaments like Nylon or Polyester to produce the authentication element in a thread form. Such an embodiment is convenient for use with garments.

Figure 5:
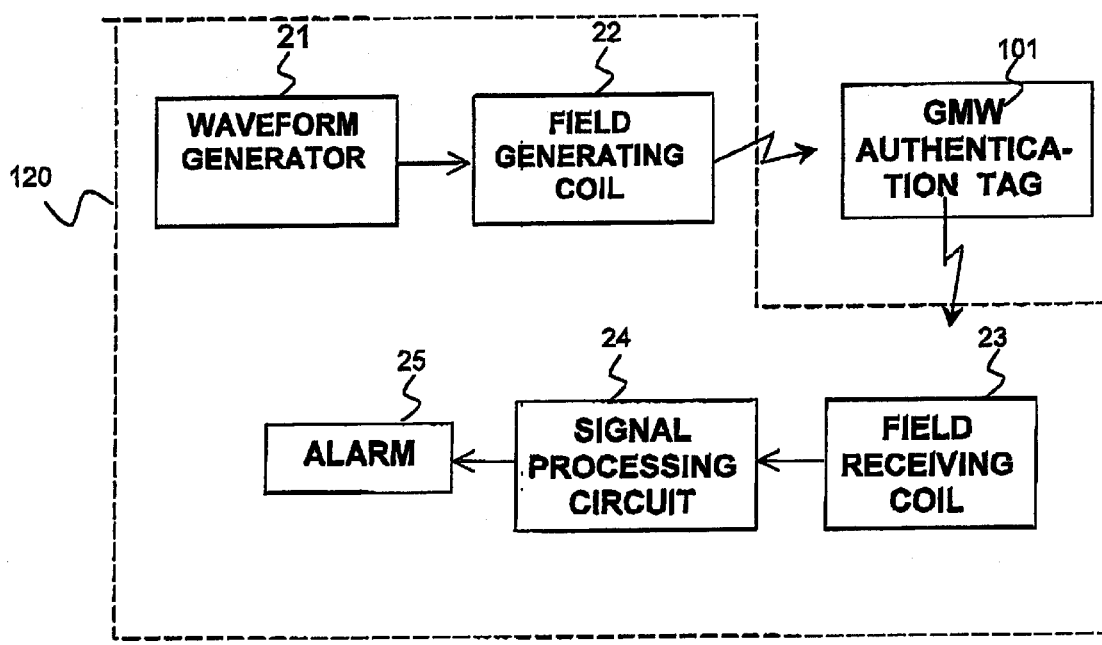
FIG. 5 is an example of a tag detector block diagram according to the present invention.

FIG. 5 exemplifies, by way of a block diagram, the main components of a detector device 120 according to the invention for use with the tag 101. The device 120 includes a waveform generator block 21 and a field generating coil 22 (constituting together an extern alternating magnetic field source) for creating the alternating magnetic field in the interrogation zone. The device includes also a field receiving coil 23 (constituting a receiver), a signal processing circuit 24, and an alarm device 25 (constituting an indicator utility).

When the tag 101 is located in the vicinity of the coils 22 and 23, the interrogating AC field causes the switching of the microwire pieces magnetization. Accordingly, very short pulses of the magnetic field perturbations are received by the field receiving coil 23. These pulses are detected by the signal processing circuit 24, which produces an output to activate the alarm 25 which may be a buzzer or LED, or both.

For the authentication of products of a specific type, the design of coils 22 and 23 may be chosen in accordance with the particular application. For example, these coils may be wound on a ferrite rod, or a ferrite ring with an air gap.

Figure 6:
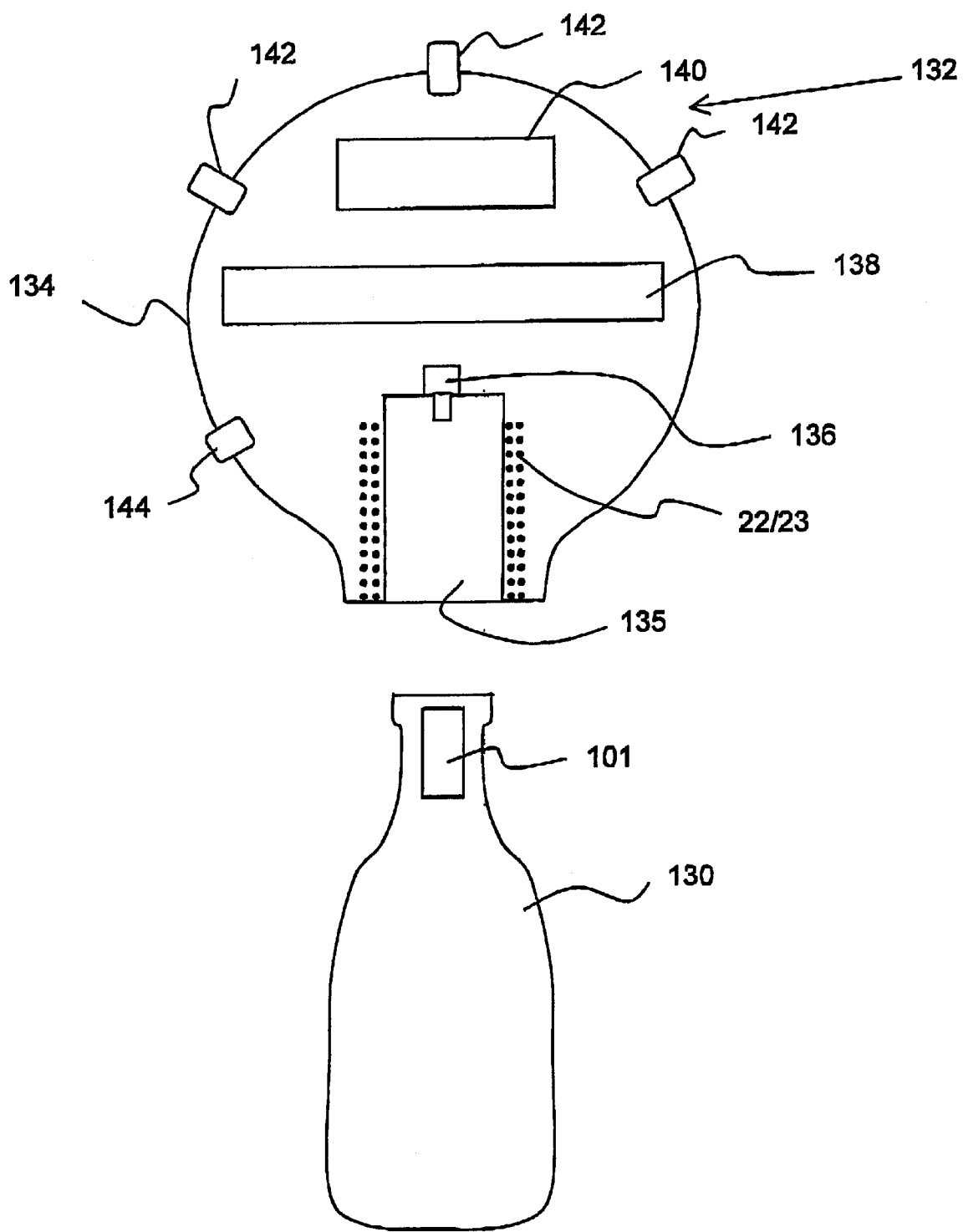
FIG. 6 illustrates an example of a system according to the invention, wherein a detector device is designed for bottle authentication.

In the embodiment variant that is intended for authentication of bottled products, the coils 22 and 23 are preferably wound on a plastic sleeve that can be put on the bottle neck. A system for product authentication utilizing such an arrangement of the field generating and receiving coils is illustrated in FIG. 6. The system utilizes an authentication tag 101 secured on the bottle neck 130 (for example, by placing the tag under a sealing strip or label typically provided on the bottles intended for sale) and a detector device 132. In the present example, the detector device 132 has a pear-shaped housing 134 for the bottle neck to be inserted into a sleeve-like portion 135 of the housing. The device 132 comprises a switch button 136, an electronic block 138 (including a signal processing circuit), a battery 140, three light indicators (LEDs) 142, and a sound indicator (alarm) 144. Thus, while the bottle neck is brought deeper into the sleeve-like portion 135, the distal end of the bottle presses the switch button 136, thereby activating the device for generating the alternating magnetic field to produce the magnetic response of the tag 101.

The principle of the microwire detection disclosed herein may be combined with other methods known in the art for increasing the information quantity contained in the tag. For example, multiple microwire pieces with different coercivities may be used in this case, several re-magnetization peaks will be detected in each period, and their pattern may be recognized, for example, by methods described in U.S. Pat. No. 4,203,544. Different coercivity values may be obtained, for example, by varying the iron content in the master alloy composition, and/or the glass coat thickness, as pointed in the above-indicated article of Antonenko et al. Another method of information encoding may be placing the microwire pieces in a specified spatial pattern, for example, in either a one-dimensional or a two-dimensional bar code.

Figure 7A:
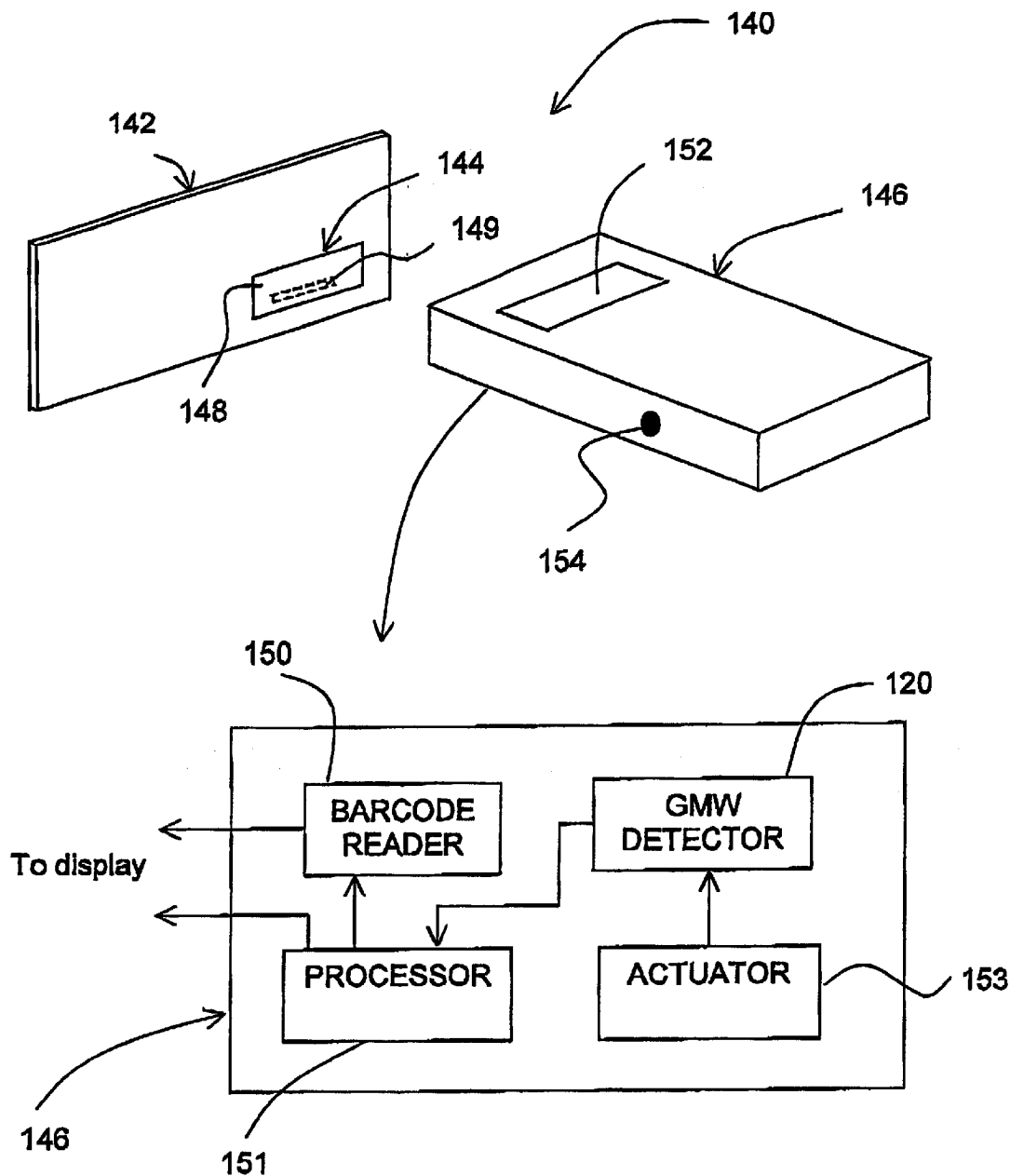
FIGS. 7a and 7b illustrate two more examples of a system according to the invention.
Figure 7B:
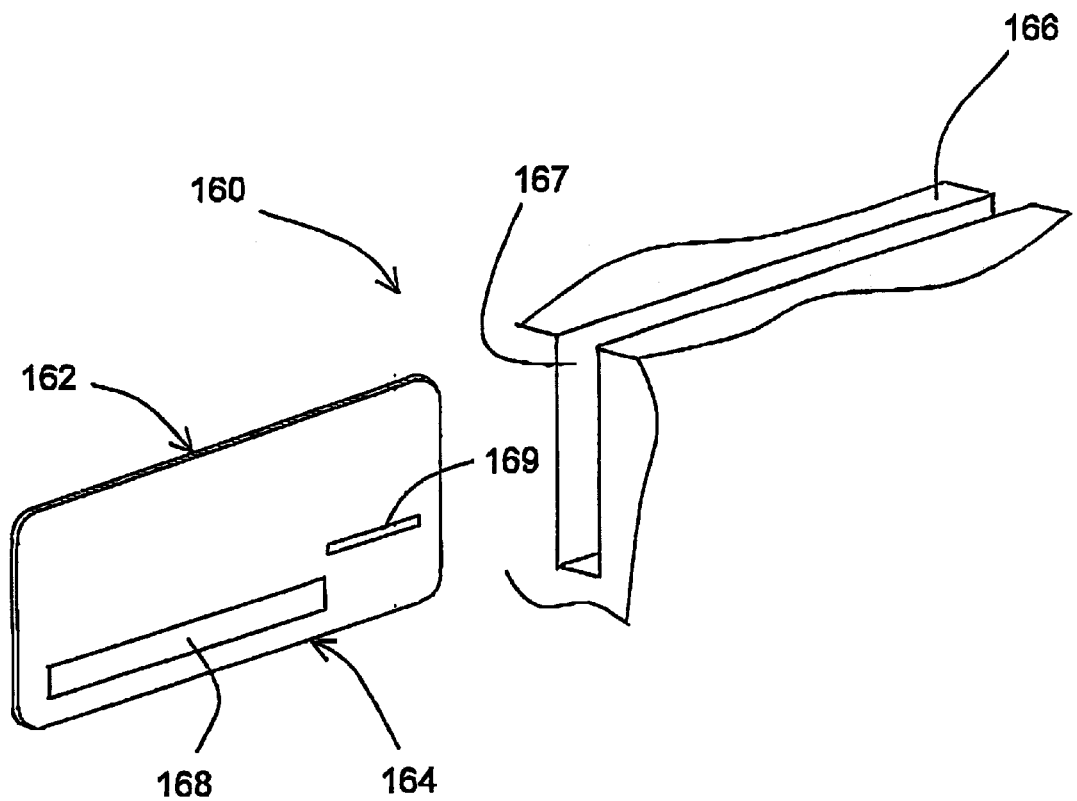

Reference is made to FIGS. 7a and 7b illustrating two examples, respectively, of a system for product identification which utilizes the detecting elements of the above system for product authentication.

In the example of FIG. 7a, the system 140 is used with a flight ticket 142 (constituting a product). The system comprises a tag assembly 144 attached to the ticket 142, and a detector unit 146 to be applied to the tag assembly 144. The tag assembly 144 is composed of a bar code 148 carrying the product-related information (constituting an identification tag) and of a magnetic authentication tag 149 according to the invention, namely, comprising one or more glass-coated amorphous magnetic microwires (1 in FIG. 1). In the present example, the authentication tag is located underneath the bar code. The detector unit 146 comprises such main constructional parts as a bar code reader 150, the detector device 120 (which is constructed as described above with reference to FIG. 5), a processor 151, a display device 152 for displaying the ticket-related information, add an actuator 153 associated with a switch button 154. The construction and operation of the bar code reader 150 are known per se and do not form part of the present invention, except to note We following. The processor 151 actuates the bar code reader 150 to scan the bar code in response to data coming from the detector device 120, namely, in response to a signal coming from the alarm utility (25 in FIG. 5).

Thus, when the flight ticket bearer submits the ticket to an authorized person, he applies the detector unit to the tag assembly 144, and presses the switch button 154 to actuate the detector device 120 (through the actuator 153). If the presence of the authentication tag 149 is detected, the alarm utility of the detector device 120 generates a corresponding signal, which actuates the bar code reader 150, and, as a result, the ticket-related information is presented on the display 152. If the authentication tag is not identified by the detector, the alarm utility generates a warning signal to cause the appearance of a corresponding message on the display. It should be understood that the display, as well as the processor 151 (i.e., data processing and analyzing utility) may be parts of a separate control unit (computer), rather than being included in the detector unit. Additionally, the warning signal may be sound or light signal generated by an appropriate indication utility, which may and may not be a constructional part of the detector unit.

In the example of FIG. 7b, the system 160 is used with a credit card 162, and comprises a tag assembly 164 and detector unit 166, which is designed wit a slot 167 for the card 162 to be inserted therein (e.g., to pass therethrough thereby enabling scanning of an information carrier provided on the card). The tag assembly 164 is composed of an encoded magnetic strip 168 carrying the card-related information, and the authentication tag 169 according to the invention. The detector unit is designed generally similar to the previously described example, namely, comprises a magnetic code reader, a detector device for identifying the glass-coated amorphous magnetic microwire(s), a processor, and, optionally, an indication utility (e.g., display). Daring the passage of the credit card 162 along the slot 167, the authentication tag is first located within a region of an alternating magnetic field created by the detector device, and then the magnetic strip is located within a magnetic field region created by the reader. The magnetic reader is actuated only if the authentication tag is successfully identified.

Those skilled in the art will readily appreciate that various modifications and changes can be applied to the invention as hereinbefore exemplified without departing from its scope defined in and by the appended claims.

What is claimed is:

1. A magnetic tag attachable to a product, the tag comprising at least one magnetic microwire for enabling authentication of the product, wherein the magnetic microwire is a glass-coated amorphous magnetic microwire characterized by a large Barkhausen discontinuity and substantially zero or positive magnetostriction, such that the microwire is responsive to an external alternating magnetic field to produce at least one short pulse of magnetic field perturbations, the at least one short pulse having a defined duration and being detected by a pulse duration detector.

2. The magnetic tag according to claim 1, wherein the magnetic microwire is made of a Co-based alloy.

3. The magnetic tag according to claim 2, wherein said alloy is Co—Fe—Si—B alloy containing 77.5% Co, 4.5%, Fe, 12% Si, and 6% B by atomic percentage.

4. The magnetic tag according to claim 2, wherein said alloy is Co—Fe—Si—B—Cr—Mo alloy containing 68.6% Co, 4.2% Fe, 12.6% Si, 11% B, 3.52% Cr and 0.08% Mo by atomic percentage.

5. The magnetic tag according to claim 1, wherein the magnetic microwire is made of a Fe-based alloy.

6. The magnetic tag according to claim 5, wherein said alloy contains 60% Fe, 15% Co, 15% Si and 10% B.

7. A detector device for detecting a magnetic tag attached to a product, the tag being composed of at least one glass-coated amorphous magnetic microwire characterized by a large Barkhausen discontinuity and substantially zero or positive magnetostriction, such that said at least one microwire can be re-magnetized by an alternating magnetic field to produce at least one short pulse of magnetic field perturbations having a defined duration, the detector device comprising: a magnetic field source operable to generate the alternating magnetic field to cause the re-magnetization of said at least one glass-coated amorphous magnetic microwire, when the microwire is located in a region of said alternating magnetic field; and a receiver for receiving said at least one short pulse of magnetic field perturbations, determining whether said at least one short pulse has at least approximately the defined duration, and generating a signal indicative that said at least one pulse has at least approximately the defined duration.

8. The device according to claim 7, wherein the magnetic field source comprises a field generating coil, and said receiver comprises a field-receiving coil.

9. The detector according to claim 8, designed for identifying the tag attached to an end portion of an elongated product, the detector comprising a housing having a sleeve-like portion for said end portion of the product to be located therein so as to be inside the coils.

10. The detector according to claim 7, and further comprising a reader for reading encoded product-related information stored in an information carrier provided on the product.

11. The detector according to claim 10, and further comprising a processor connected to said receiver and operable to actuate the reader in response to a signal generated by the receiver.

12. A product comprising a tag assembly attached thereto, wherein the tag assembly comprises a magnetic tag comprising at least one glass-coated amorphous magnetic microwire characterized by a large Barkhausen discontinuity and substantially zero or positive magnetostriction, such that, when the tag is located in a region of an external alternating magnetic field, the at least one microwire is re-magnetized by the magnetic field to produce at least one short pulse of magnetic field perturbations, the at least one short pulse having a defined duration and being detected by a pulse duration detector.

13. The product according to claim 12, wherein the tag assembly also comprises an information carrier carrying product-related information.

14. A system for product authentication, the system comprising: a magnetic tag for attaching to a product, the tag comprising at least one glass-coated amorphous magnetic microwire characterized by a large Barkhausen discontinuity and substantially zero or positive magnetostriction, such that said at least one microwire can be re-magnetized by an alternating magnetic field to produce at least one short pulse of magnetic field perturbations having a defined duration; a detector device for detecting said tag, the detector device comprising a magnetic field source operable to generate the alternating magnetic field to cause the re-magnetization of said at least one glass-coated amorphous magnetic microwire, when the microwire is located in a region of said alternating magnetic field, and a receiver for receiving said at least one short pulse, determining whether said at least one short pulse has at least approximately the defined duration, and generating a signal indicative that said at least one pulse has at least approximately the defined duration; and an indicator utility responsive to the signal generated by the receiver to provide an indication signal.

15. The system according to claim 14, and also comprising a reader for reading encoded product-related information stored in an information carrier attachable to the product.

* * * * *